Patented July 10, 1951

2,559,947

UNITED STATES PATENT OFFICE 2,559,947

1,2-DIOLEFINS AS MODIFIERS IN THE ALKALI - METAL - CATALYZED POLYMERIZATION OF CONJUGATED DIOLEFINS

Willie W. Crouch, Bartlesville, Okla., assignor to Phillips Petroleum Company, a corporation of Delaware No Drawing. Application August 1, 1947, Serial No. 765,639

17 Claims. (Cl. 260—83.7)

This invention relates to an improved process for effecting mass polymerization reactions wherein finely divided alkali metals are employed as catalysts. In a particular embodiment this invention relates to the production of polymers of controlled viscosity and superior processing characteristics by an alkali metal-catalyzed mass polymerization process. In one aspect the invention relates to a method for controlling the viscosity of polymers produced by mass polymerization reactions, the method comprising the addition of a 1,2-diolefin, such as 1,2-butadiene, to the polymerization recipe.

While the mass polymerization of diolefins, such as 1,3-butadiene, isoprene, 2,3-dimethyl butadiene, and the like, either per se or in combination with other polymerizable organic compounds such as styrene, alpha-methyl styrene, and other compounds containing the vinyl group, is known to result in polymers possessing rubber-like characteristics, numerous difficulties attendant upon this type of polymerization have made the process unattractive and have retarded its development on a commercial basis. One of the principal difficulties encountered heretofore has been the inability to control the viscosity of the polymer and therefore to vary the properties of the product to produce the type of material desired. In emulsion polymerization systems additive agents such as mercaptans are employed to prevent cross-linkage of polymer chains and to control the viscosity of the product. These additive agents which have found widespread application in emulsion polymerization processes are generally not applicable in mass polymerization reactions. In cases where their use might appear feasible, reactivity with the alkali metal catalyst would prevent their incorporation into the recipe.

I have now found a method for carrying out alkali metal-catalyzed mass polymerization reactions wherein the viscosity of the product can be regulated within broad limits by the addition of a novel viscosity-controlling agent to the system, namely, a 1,2-diolefin, such as 1,2-butadiene, 1,2-pentadiene, 3-methyl-1,2-butadiene, and the like. By the incorporation of unusually small amounts of 1,2-diolefinic material and particularly 1,2-butadiene, into the polymerization mixture, low viscosity, gel-free, polymers are produced at monomer conversion as high as 100 per cent.

The monomeric material polymerized to produce polymers by the process of this invention comprises unsaturated organic compounds which generally contain the characteristic structure $CH_2=C<$ and, in most cases, have at least one of the disconnected valences attached to an electronegative group, that is, a group which increases the polar character of the molecule such as an organic group containing a double or triple bond such as vinyl, phenyl, or the like. Included in this class of monomers are the conjugated butadienes or 1,3-butadienes such as butadiene (1,3-butadiene), 2,3-dimethyl-1,3-butadiene, isoprene, piperylene, 3 - furyl - 1,3 - butadiene, 3-methoxy-1,3-butadiene and the like; aryl olefins such as styrene, various alkyl styrenes, p-methoxy styrene, alpha-methyl styrene, vinyl naphthalene and similar derivatives thereof, and the like; methyl vinyl ether, vinyl furane, and other unsaturated hydrocarbons, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers. Various unsaturated acids, halogen compounds, esters, nitriles, and the like, which react directly with alkali metals, are not suitable as monomers in the process of this invention.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith in the presence of an alkali metal catalyst, such as aryl olefins, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

One object of this invention is to polymerize unsaturated organic compounds.

Another object of this invention is to produce an improved synthetic rubber.

A further object of this invention is to produce a synthetic rubber by polymerization of monomeric material.

A still further object of this invention is to improve the mass polymerization of diolefin organic compounds.

Still another object of this invention is to control the viscosity of polymeric materials.

Another object of this invention is to produce a synthetic rubber having superior processing characteristics.

A further object of this invention is to produce an improved polymeric product by mass polymerization of unsaturated organic compounds in the presence of an alkali metal as a catalyst.

Other objects and advantages of this invention will become apparent, to one skilled in the art, from the accompanying disclosure and discussion.

A significant feature of this invention lies in the ability to produce polymers of widely varying viscosity by the addition of unusually small amounts of 1,2-butadiene to the mixture to be polymerized. The results achieved through the use of this additive agent are wholly unexpected, particularly since such marked changes in the viscosity of the product can be produced by such a small quantity of the viscosity-controlling material. It is especially noteworthy that polymeric material having a very low viscosity can be prepared by the method of my invention, and at times even products resembling viscous syrups and oils can be produced. On the other hand, gel-free polymers of high viscosity can also be obtained, if desired. The characteristics of the product are dependent upon the monomeric material itself, the ratio of comonomers, if such are used, and the amount of the alkali metal catalyst employed, as well as upon the quantity of 1,2-butadiene incorporated into the polymerization recipe. In general, when butadiene-styrene copolymers are prepared, tougher products are obtained as the ratio of butadiene to styrene is increased. The addition of 1,2-butadiene to such a formulation affords a method of obtaining a polymeric material of the desired viscosity while at the same time retaining desirable properties of polymeric materials prepared using higher butadiene-styrene ratios than the 75:25 ratio frequently employed. Another important advantage in the use of my viscosity-controlling agent lies in the fact that smaller amounts of catalyst are required than are normally considered essential for the production of polymers with the desired viscosity. In the absence of 1,2-butadiene, progressively tougher polymers are obtained as the amount of catalyst is decreased. The increased plasticity of polymers, brought about through the use of 1,2-butadiene, is readily observed when no more than 0.01 to 0.02 part of this additive agent per 100 parts of monomers is charged to the polymerization recipe.

In one specific embodiment my process comprises the copolymerization of butadiene and styrene in the presence of a catalyst consisting of a suspension of a very finely divided alkali metal, such as sodium. A small quantity of 1,2-butadiene is incorporated into the charge and the reactants polymerized, with agitation under controlled conditions. The styrene is first charged to the reactor, after which the 1,3-butadiene containing a small amount of 1,2-butadiene which acts as a viscosity-controlling agent is introduced. If a diluent is employed in the polymerization it is generally introduced with the butadiene. The butadiene or butadiene-diluent mixture is usually charged in liquid phase to the reactor. Toward the end of this operation, or subsequent to it, the catalyst is added and the mixture agitated at a predetermined reaction temperature throughout the course of the reaction. When conversion has reached a desired extent of completion the polymerized material is removed from the reactor to a wash mill where the polymer is washed for a sufficient length of time to remove the catalyst. An antioxidant such as phenyl-beta-naphthylamine is then added after which the polymer is dried. In cases where a diluent is employed, it is removed in any manner desired prior to washing the polymer on the wash mill. In some instances, particularly where very soft polymers are produced, other methods of separation of the product may be preferred such as solution in benzene followed by precipitation with methanol.

The amount of 1,2-diolefin employed to perform the viscosity-controlling function described herein will generally range from 0.01 to 0.5 part by weight per 100 parts of monomeric material charged with a range of 0.02 to 0.2 part being most frequently preferred. The quantity of 1,2-diolefin added is governed by the type of product desired and the particular formulation used including the amount of catalyst charged. In some cases the amount of my viscosity-controlling agent used may be in the same order of magnitude as the alkali metal catalyst employed.

In the process of this invention it is frequently preferred to operate in the presence of diluents although their use is optional. Inert hydrocarbon diluents comprising isobutane, n-pentane, n-heptane, cyclohexane, and benzene are applicable. The amount of diluent employed may range from about 25 to as high as 200 parts by weight per 100 parts of monomeric material charged, with an amount of 50 to 150 parts being most generally preferred. In some cases the amount of diluent used may be in the same order of magnitude as the monomeric material employed.

The ratio of comonomers used in my process is variable. In the case of butadiene-styrene copolymerizations, the amount of styrene may range from 0 to about 50 parts per 100 parts of monomeric material, as desired. One advantage in the use of high butadiene-styrene ratios is that the polymers produced have better low temperature properties than when less butadiene is charged. However, with the normal method of operation these polymers are tough and difficult to process. The use of my viscosity-controlling agent overcomes this objection.

The catalysts of this invention comprise finely divided suspensions of alkali metals, with sodium and potassium being most generally preferred. The preparation of the catalyst involves charging a dispersion medium such as xylene to any conventional type of reaction vessel where it is heated to a temperature of about 100 to 115° C. in an atmosphere of dried, oxygen-free, nitrogen after which the freshly cut metal, such as sodium is added. The amount of metal employed is usually within the range of about 5 to about 35 per cent by weight, based on the dispersing medium, with a range of about 10 to 20 per cent usually preferred. The temperature is adjusted to about 110° C. and the mixture vigorously agitated, such as with an efficient stirrer operated at high speed (5,000 to 10,000 R. P. M.), for a period usually ranging from five to fifteen minutes or until a stable dispersion is produced. The system is allowed to cool to about 100° C. when agitation is stopped. A catalyst thus prepared is ready for introduction into the polymerization recipe. If desired a dispersion stabilizer such as carbon black or an alkali metal mercaptide may be employed in the preparation of the catalyst. Catalysts prepared by the use of these dispersion stabilizers are described in my copending applications Serial Numbers 671,899 and 671,900, filed May 23, 1946, now U. S. Patents 2,483,886 and 2,483,887, resp.

The amount of catalyst employed may vary from about 0.1 to about 1.0 part by weight per 100 parts of monomeric material charged. When my additive agent is incorporated into the reaction mixture the amount of catalyst used may be as low as about 0.15 and a soft polymer obtained. In the absence of a 1,2-diolefin such as 1,2-butadiene, tough polymers are formed as the amount of catalyst is decreased, and when the quantity of catalyst is as low as about 0.25 part the polymers are quite tough and difficult to process.

While the description of this invention has been confined to batch operation, the polymerization is equally applicable to a continuous process. It is to be understood that numerous variations may be introduced, both in methods of operation and formulations employed, without departing from the scope of the disclosure.

Advantages of this invention are illustrated by the following example. The reactants, and their proportions, and the other specific ingredients of the recipes are presented as being typical and should not be construed to limit invention unduly.

*Example I*

A series of eight sodium-catalyzed polymerization reactions was carried out using 75 parts 1,3-butadiene, 25 parts styrene, 0.4 part finely divided sodium, and 75 parts isobutane. The reaction mixture was agitated while the temperature was held at 40° C. for a period of 21 hours. At the conclusion of this reaction period the monomer conversion had reached 100 per cent in all cases. Two of the runs were carried out as controls and in the remaining six varying amounts of 1,2-butadiene were present in the charge. All polymers were gel free. The following tabulation shows the parts 1,2-butadiene used in the various polymerizations and the intrinsic viscosity of the polymer produced in each case:

| 1,2-Butadiene, parts | Intrinsic Viscosity |
| --- | --- |
| 0 | 2.84 |
| 0 | 2.77 |
| 0.0075 | 2.50 |
| 0.0075 | 2.66 |
| 0.022 | 2.30 |
| 0.022 | 2.08 |
| 0.037 | 1.78 |
| 0.037 | 1.79 |

*Example II*

The following recipe was employed for preparing butadiene-styrene copolymers: 75 parts 1,3-butadiene, 25 parts styrene, and 0.3 part sodium. The reactants were agitated at 30° C. throughout the reaction period. Two runs were carried out as controls while in the remaining ones varying quantities of 1,2-butadiene were present. All polymers were gel free. The following table shows the amount of 1,2-butadiene added, the polymerization time, the per cent conversion, and the intrinsic viscosity:

| 1,2-Butadiene, Parts | Polymerization Time, Hours | Conversion, Per Cent | Intrinsic Viscosity |
| --- | --- | --- | --- |
| 0 | 5 | 91.5 | 2.43 |
| 0 | 5 | 89 | 2.53 |
| 0.025 | 5.5 | 96 | 1.26 |
| 0.025 | 5.5 | 100 | 1.32 |
| 0.05 | 6 | 98 | 1.13 |
| 0.05 | 6 | 100 | 1.24 |
| 0.10 | 10 | 98 | 0.81 |
| 0.10 | 10 | 98 | 0.84 |

As will be evident to those skilled in the art, various modifications of this invention can be made, or followed, in the light of the foregoing disclosure and discussion, without departing from the spirit or scope of the disclosure or from the scope of the claims.

I claim:

1. In the production of synthetic rubber by polymerization of a liquid mixture containing a monomeric material comprising a major amount of 1,3-butadiene and a minor amount of styrene, in the presence of finely divided sodium as polymerization catalyst, the improvement which comprises adding to said liquid mixture a hydrocarbon diluent selected from the group consisting of paraffins, cycloparaffins and aromatics in an amount between about 25 and about 200 parts and also adding 1,2-butadiene in an amount between about 0.01 and about 0.5 part, each being parts by weight per 100 parts of said monomeric material, whereby a polymeric product is obtained.

2. In the production of synthetic rubber by polymerization of a mixture containing a monomeric material comprising a major amount of 1,3-butadiene and a minor amount of styrene, in the presence of finely divided sodium as polymerization catalyst, the improvement which comprises adding to said mixture, 1,2-butadiene in the amount of between about 0.01 and about 0.5 part by weight per 100 parts of said monomeric material.

3. In the production of synthetic rubber by polymerization of a liquid mixture containing a monomeric material comprising a major amount of a 1,3-diolefin and a minor amount of a vinyl aromatic hydrocarbon, in the presence of a finely divided alkali metal as polymerization catalyst, the imprvoement which comprises adding to said liquid mixture a hydrocarbon diluent selected from the group consisting of paraffins, cycloparaffins and aromatics in an amount between about 25 and about 200 parts and also adding 1,2-butadiene in an amount between about 0.01 and about 0.5 part, each being parts by weight per 100 parts of said monomeric material, whereby a polymeric product is obtained.

4. In the production of synthetic rubber by polymerization of a liquid mixture containing a monomeric material comprising a major amount of a 1,3-diolefin and a minor amount of a vinyl aromatic hydrocarbon, in the presence of a finely divided alkali metal as polymerization catalyst, the improvement which comprises adding to said liquid mixture 1,2-butadiene in an amount between about 0.01 and about 0.5 part by weight per 100 parts of said monomeric material.

5. In the production of synthetic rubber by polymerization of a liquid mixture containing a monomeric material comprising a major amount of 1,3-butadiene and a minor amount of styrene, in the presence of finely divided sodium as polymerization catalyst, the improvement which comprises adding to said liquid mixture a hydrocarbon diluent selected from the group consisting of paraffins, cycloparaffins and aromatics and in an amount between about 25 and about 200 parts and also adding 1,2-diolefin in an amount between about 0.01 and about 0.5 part, each being parts by weight per 100 parts of said monomeric material.

6. In the production of synthetic rubber as claimed in claim 5 wherein the 1,2-diolefin is one containing at least four and not more than five carbon atoms per molecule.

7. In the production of synthetic rubber as claimed in claim 11 wherein the 1,2-diolefin is one having at least four carbon atoms and not more than five carbon atoms per molecule.

8. The production of synthetic rubber as claimed in claim 13 wherein the 1,2-diolefin is one having at least four carbon atoms and not more than five carbon atoms per molecule.

9. In the production of synthetic rubber by the polymerization of a liquid mixture containing a monomeric material comprising a major amount of 1,3-butadiene and a minor amount of styrene, in the presence of finely divided sodium as catalyst, the improvement which comprises adding to said liquid mixture isobutane in the amount between 25 and 200 parts and also adding 1,2-butadiene in an amount between 0.01 and 0.5 part, each being parts by weight per 100 parts of said monomeric material.

10. In the production of polymeric material of high molecular weight by the copolymerization of a conjugated diolefin and a minor proportion of a monomeric material selected from the group consisting of vinyl aromatic hydrocarbon, vinyl ether, and vinyl furan, in the presence of an alkali metal catalyst, the improvement which comprises adding to the reaction mixture 1,2-butadiene in the amount of the same magnitude as said alkali metal catalyst.

11. In the production of a polymeric material of high molecular weight by the copolymerization of a conjugated diolefin and a minor proportion of a monomeric material selected from the group consisting of vinyl aromatic hydrocarbon, vinyl ether, and vinyl furan, in the presence of an alkali metal catalyst, the improvement which comprises adding to the reaction mixture a liquid hydrocarbon diluent selected from the group consisting of paraffins, cycloparaffins and aromatics in an amount of the same magnitude as said conjugated diolefin and said monomeric material, also adding 1,2-diolefin in the amount of the same magnitude as said alkali metal catalyst.

12. In the production of a polymeric material of high molecular weight by the copolymerization of a conjugated diolefin and a minor proportion of a monomeric material selected from the group consisting of vinyl aromatic hydrocarbon, vinyl ether, and vinyl furan, in the presence of an alkali metal catalyst, the improvement which comprises adding to the reaction mixture 1,2-diolefin in the amount of the same magnitude as said alkali metal catalyst.

13. In the production of a polymeric material of high molecular weight by the polymerization of a monomeric material comprising a major proportion of a conjugated diolefin in the presence of a finely divided alkali metal catalyst, the improvement which comprises adding to the reaction mixture a liquid hydrocarbon diluent selected from the group consisting of paraffins, cycloparaffins and aromatics in an amount of the same magnitude as said monomeric material, also adding 1,2-diolefin in an amount of the same magnitude as said alkali metal catalyst.

14. In the production of a polymeric material of high molecular weight by the polymerization of a monomeric material comprising a major proportion of a conjugated diolefin in the presence of a finely divided alkali metal catalyst, the improvement which comprises adding to the reaction mixture 1,2-diolefin in the amount of the same magnitude as said alkali metal catalyst.

15. In the production of a polymeric material of high molecular weight by the polymerization of a monomeric material comprising a major proportion of a conjugated diolefin in the presence of a finely divided alkali metal catalyst, the improvement which comprises adding to the reaction mixture 1,2-butadiene in the amount of the same magnitude as said alkali metal catalyst.

16. In the production of a polymeric material of high molecular weight by the polymerization of a monomeric material comprising a major proportion of a 1,3-diolefin in the presence of a finely divided alkali metal catalyst, the improvement which comprises adding to the reaction mixture a hydrocarbon diluent selected from the group consisting of paraffins, cycloparaffins and aromatics in an amount of the same magnitude as said monomeric material and also adding 1,2-diolefin in the amount of the same magnitude as said alkali metal catalyst.

17. In the production of a polymeric material of high molecular weight by the polymerization of a major proportion of 1,3-diolefin in the presence of a finely divided alkali metal catalyst, the improvement which comprises adding to the reaction mixture heptane as a diluent in an amount of the same magnitude as the 1,3-diolefin and also adding 1,2-butadiene in the amount of the same magnitude as said alkali metal catalyst.

WILLIE W. CROUCH.

REFERENCES CITED

The following references are of record in the file of this patent:

Starr et al.; Am. Chemical Soc., "Abstracts of Papers, 109th Meeting," Atlantic City, N. J., April 8–12, 1946, page 11–0.

Starr et al.; Ind. Eng. Chem., 38, p. 1020–1025, Oct. 1946, 260–93 Lit.

Powers: "Synthetic Resins and Rubbers," p. 205–208 (1943).